United States Patent [19]

Lenzen

[11] Patent Number: 4,924,774

[45] Date of Patent: May 15, 1990

[54] APPARATUS FOR IGNITING A PYROTECHNIC TRANSMISSION LINE

[75] Inventor: Reiner Lenzen, Almont, Mich.

[73] Assignee: TRW Vehicle Safety Systems Inc., Lyndhurst, Ohio

[21] Appl. No.: 352,389

[22] Filed: May 16, 1989

[51] Int. Cl.$^5$ .......................... F42B 3/12; F42C 19/00
[52] U.S. Cl. .......................... 102/202.7; 102/275.6; 280/735
[58] Field of Search ............... 280/741, 735, 734, 733, 280/728; 102/202.5, 202.7, 200, 275.6

[56] References Cited

U.S. PATENT DOCUMENTS

| | | | |
|---|---|---|---|
| 3,366,055 | 1/1968 | Hollander | 102/202.7 |
| 3,590,739 | 7/1971 | Persson | 102/275.5 |
| 4,272,102 | 6/1981 | Burkdoll | 280/734 |
| 4,573,322 | 3/1986 | Föhl | 280/805 |
| 4,708,060 | 11/1987 | Bickes, Jr. et al. | 102/202.7 |

*Primary Examiner*—David H. Brown
*Attorney, Agent, or Firm*—Tarolli, Sundheim & Covell

[57] ABSTRACT

An apparatus for actuating an actuatable vehicle safety device, such as an airbag inflator, includes an ignitable pyrotechnic transmission line having one end connected with the vehicle safety device. The safety device actuates in response to ignition of the pyrotechnic transmission line. The other end of the pyrotechnic transmission line is connected with an actuatable semiconductor bridge which, when actuated, ignites the pyrotechnic transmission line. The semiconductor bridge actuates in response to receiving a firing signal indicative of a vehicle collision from an impact sensor. Thus, when a vehicle collision occurs, the impact sensor provides the firing signal to actuate the semiconductor bridge which, in turn, ignites the pyrotechnic transmission line to thereby actuate the airbag inflator.

20 Claims, 2 Drawing Sheets

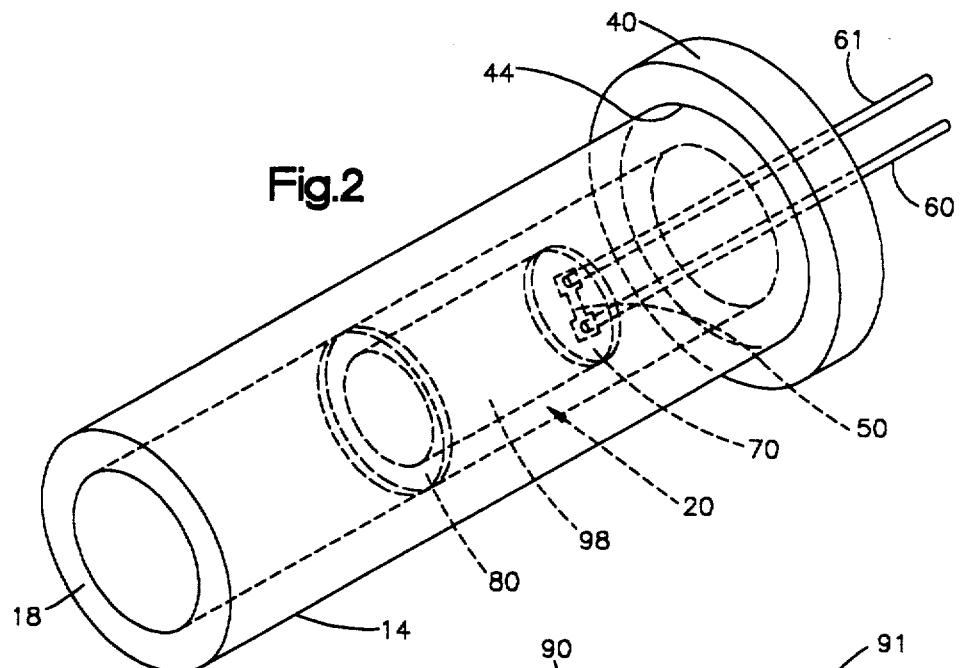
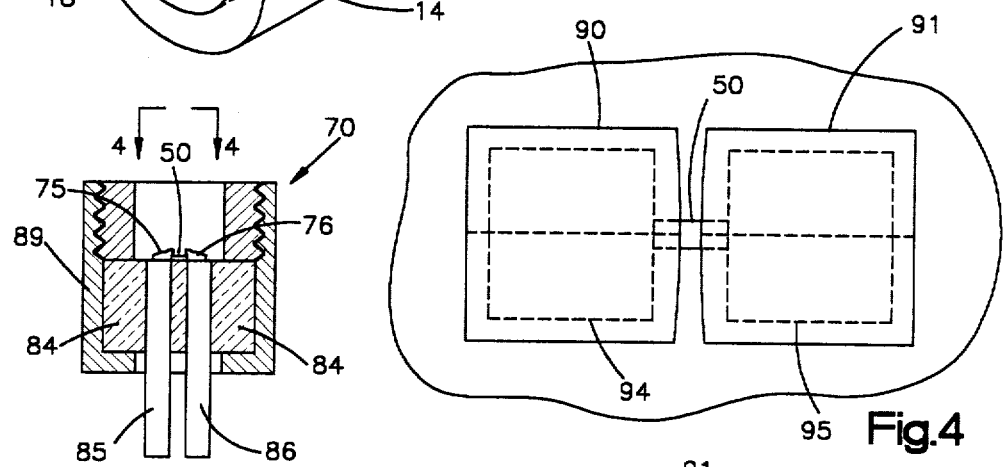
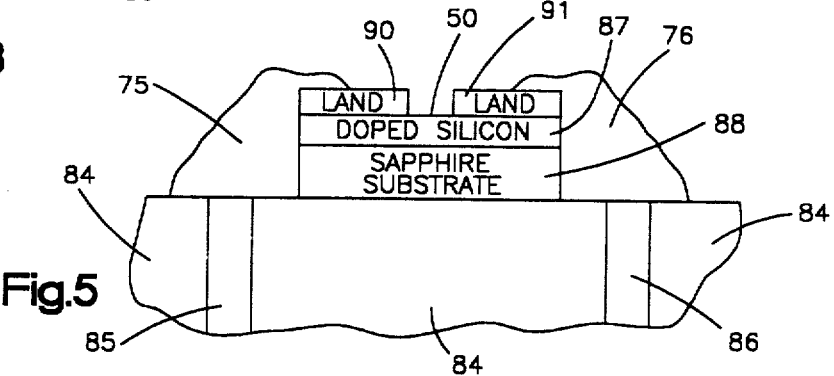

APPARATUS FOR IGNITING A PYROTECHNIC TRANSMISSION LINE

BACKGROUND OF THE INVENTION

1. Technical Field

The present invention relates to ignition of a pyrotechnic transmission line, and is particularly directed to an apparatus including an ignitable pyrotechnic transmission line which, when ignited, actuates a vehicle safety device, such as an airbag inflator, during a vehicle collision.

2. Background Art

The use of an ignitable pyrotechnic transmission line for actuating an airbag inflator is known. The airbag inflator includes ignitable gas-generating propellant grains which are ignited in response to ignition of the pyrotechnic transmission line. Typically, the pyrotechnic transmission line is ignited in response to actuation of a squib which, in turn, is actuated in response to an energy signal from an impact sensor. The impact sensor provides the energy signal when it senses a vehicle collision.

A known igniter for igniting explosives is a semiconductor bridge. One such igniter is disclosed in U.S. Pat. No. 4,708,060 to Bickes, Jr., et al., issued Nov. 24, 1987. The igniter in U.S. Pat. No. 4,708,060 includes a burstable semiconductor bridge which, upon bursting, ignites explosive powder located adjacent to the semiconductor bridge. The semiconductor bridge bursts and ignites the explosive powder when an electrical current of not less than a predetermined magnitude is passed through the semiconductor bridge for at least a predetermined time duration.

Although the igniter in U.S. Pat. No. 4,708,060 is disclosed as being suitable for igniting explosive powder, there is no disclosure in the patent that a pyrotechnic transmission line can be directly ignited by bursting of a semiconductor bridge. An example of a pyrotechnic transmission line is "TLX" (trademark, Explosive Technology, Inc. of Fairfield, California). A TLX pyrotechnic transmission line includes a tube made of a plastic material which can withstand high temperature, such as "KYNAR" (trademark, E. I. DuPont de Nemours & Co. of Wilmington, Delaware) or "HALAR" (trademark, E. I. DuPont de Nemours & Co. of Wilmington, Delaware), on which a reactive coating is disposed. An example of the reactive coating is made of a material including 10.5% aluminum powder and 89.5% "HMX". HMX is cyclotetramethylene-tetranitramine. The velocity of the ignition of a TLX pyrotechnic transmission line is in the range of 5,000–6,000 feet/second.

TLX can be used as an ignitable pyrotechnic transmission line for igniting gas-generating propellant grains in an airbag inflator. TLX is ignited when the reactive coating on the tube is subjected to a pressure pulse of at least a predetermined magnitude for at least a predetermined time duration. There is no disclosure in U.S. Pat. No. 4,708,060 that a semiconductor bridge can be used to provide a pressure pulse of not less than a predetermined magnitude for at least a predetermined time duration to ignite a TLX pyrotechnic transmission line.

SUMMARY OF THE INVENTION

The present invention comprises an ignitable pyrotechnic transmission line that includes a tube having reactive material therein. The reactive material ignites when subjected to a pressure pulse of a predetermined magnitude for a predetermined time duration. An actuatable semiconductor bridge is operatively connected with one end of the pyrotechnic transmission line and, when actuated, creates a pressure pulse of at least the predetermined magnitude for at least the predetermined time duration to ignite the reactive material.

The present invention may also include an actuatable airbag inflator which, when actuated, inflates an airbag to protect an occupant of a vehicle during a collision. An ignitable pyrotechnic transmission line includes a tube having reactive material therein. The reactive material ignites when subjected to a pressure pulse of a predetermined magnitude for a predetermined time duration. The pyrotechnic transmission line has one end connected to the actuatable airbag inflator and, when ignited, actuates the airbag inflator. An actuatable semiconductor bridge is spaced apart from the airbag inflator and is operatively connected to the other end of the pyrotechnic transmission line. The semiconductor bridge, when actuated, creates the pressure pulse of at least the predetermined magnitude for at least the predetermined duration to ignite the reactive material. An impact sensor is operatively connected with the semiconductor bridge for sensing a collision of the vehicle and for providing a firing signal in response to the collision. The firing signal actuates the semiconductor bridge to ignite the pyrotechnic transmission line and thereby to actuate the airbag inflator.

BRIEF DESCRIPTION OF THE DRAWINGS

The foregoing and other features of the present invention will become apparent to one skilled in the art to which the present invention relates from reading the following description of a preferred embodiment of the present invention with reference to the accompanying drawings, wherein:

FIG. 2 is a schematic perspective view on an enlarged scale of a portion of the vehicle safety system of FIG. 1;

FIG. 3 is a schematic diagram illustrating the construction of a semiconductor bridge used in the vehicle safety system of FIG. 1;

FIG. 4 is an enlarged top view, taken approximately along the line 4—4 of FIG. 3, showing some parts of the semiconductor bridge of FIG. 3; and FIG. 5 is an enlarged view of a portion of the semiconductor bridge of FIG. 3.

DESCRIPTION OF A PREFERRED EMBODIMENT

Figure 1:
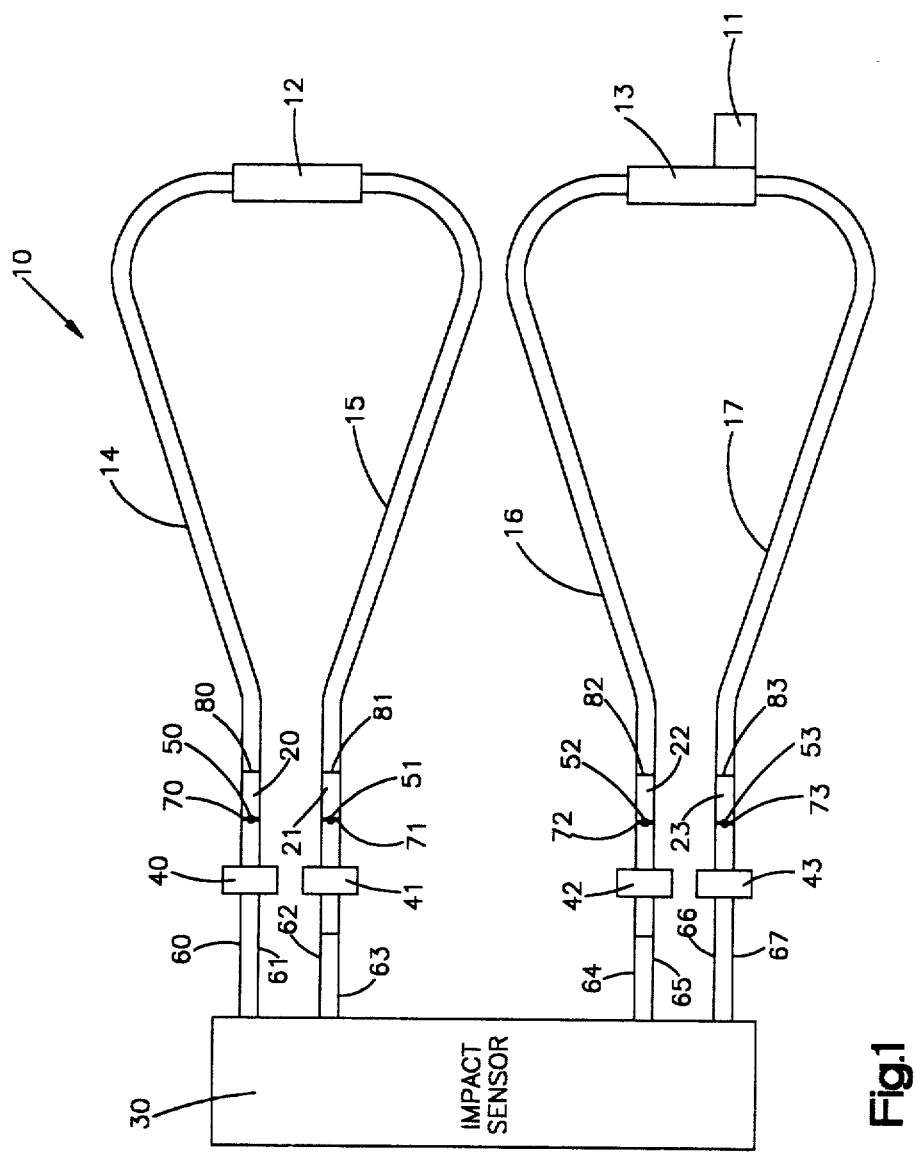
FIG. 1 is a schematic diagram of a portion of a vehicle safety system incorporating the present invention.

As shown in FIG. 1, a vehicle safety system 10 includes an actuatable seatbelt pretensioner 13 having a pair of ignitable pyrotechnic transmission lines 16, 17 connected to the pretensioner 13. The pretensioner 13 is actuated in response to ignition of either one or both of the pyrotechnic transmission lines 16, 17. The pretensioner 13, when actuated, rotates a spool of a seat belt retractor 11 in a belt retraction direction. A known seat belt pretensioner is disclosed in U.S. Pat. No. 4,573,322 entitled "Driving Device Especially for Return Stiffening of a Safety Belt in an Automatic Safety Belt Wind-Up Device", and issued on Mar. 4, 1986. The structure and operation of seat belt pretensioners are well known and, therefore, will not be described herein.

The vehicle safety system 10 further includes an actuatable airbag inflator 12 having a pair of ignitable pyrotechnic transmission lines 14, 15 connected to the inflator 12. The pyrotechnic transmission lines 14, 15 are connected to axially opposite ends of the inflator 12. The inflator 12 actuates in response to ignition of either one or both of the pyrotechnic transmission lines 14, 15. The inflator 12, when actuated, acts to generate a gas which is directed into the interior of an inflatable airbag (not shown) of the vehicle safety system 10. The airbag inflates to protect a vehicle occupant during a vehicle collision.

Each of the pyrotechnic transmission lines 14, 15, 16, 17 is capable of conducting an explosive energy signal along its length. An example of such a pyrotechnic transmission line is "TLX" (trademark, Explosive Technology, Inc. of Fairfield, California). As shown in FIG. 2, a TLX pyrotechnic transmission line includes a tube 18 made of a plastic material which can withstand high temperature, such as "KYNAR" (trademark, E. I. DuPont de Nemours & Co. of Wilmington, Delaware) or "HALAR" (trademark, E. I. DuPont de Nemours & Co. of Wilmington, Delaware), on which a reactive coating 99 is disposed. Alternatively, the tube 18 may be made of polyvinylchloride. An example of the reactive coating is made of a material including 10.5% aluminum powder and 89.5% "HMX". HMX is cyclotetramethylenetetranitramine. The velocity of the ignition of a TLX pyrotechnic transmission line is in the range of 5,000–6,000 feet/second.

The inflator 12 further includes a chamber in which ignitable gas-generating propellant grains (not shown) are disposed. The arrangement of the propellant grains within the chamber is known, and will not be described herein. One arrangement of propellant grains in an inflator is described in pending patent application Ser. No. 243,618, entitled "Igniter for an Inflatable Occupant Restraint", and filed on Sept. 13, 1988. The propellant grains ignite when at least one of the pyrotechnic transmission lines 14, 15 ignites. When the propellant grains ignite in response to at least one of the pyrotechnic transmission lines 14, 15 igniting, gases, flame and pressure are generated within the inflator 12. The burning of the propellant grains generates a sufficient amount of gas for inflating the airbag. The gas is delivered to the interior of the airbag thereby to inflate the airbag.

The other end of the pyrotechnic transmission line 14, i.e., the end not connected to the inflator 12, is mechanically connected to an annular header 40. The other end of the pyrotechnic transmission line 15, i.e., the end not connected to the inflator 12, is mechanically connected to an annular header 41. Similarly, the other end of the pyrotechnic transmission line 16, i.e., the end not connected to the pretensioner 13, is mechanically connected to an annular header 42. The other end of the pyrotechnic transmission line 17, i.e., the end not connected to the inflator, is mechanically connected to an annular header 43. The interconnections between the headers 40, 41, 42, 43 and their respective pyrotechnic transmission lines 14, 15, 16, 17 are the same. For simplicity, only the interconnection between the header 40 and the pyrotechnic transmission line 14 is described herein in detail.

The annular header 40 has an opening 44 which receives the pyrotechnic transmission line 14. The outer periphery of the tube 18 is secured by a suitable adhesive such as an epoxy in the opening 44. A containment cup 20 is located in the pyrotechnic transmission line 14 at the end of the pyrotechnic transmission line 14 secured to the header 40. The outer periphery of the containment cup 20 is secured to the inner periphery of the tube 18 by a suitable adhesive. The containment cup 20 has one end to which a circular burst disc 80 is connected and an axially opposite end to which a semiconductor bridge chip 70 is connected. The burst disc 80 is made of a frangible material and is preferably made of aluminum foil having a thickness of .001 inch. The burst disc 80 is secured to the end of the containment cup 20 farthest away from the header 40 by a suitable adhesive. The semiconductor bridge chip 70 is secured to the end of the containment cup 20 nearest to the header 40 also by a suitable adhesive.

The specific construction of the semiconductor bridge chip 70 is better understood with reference to FIGS. 3, 4 and 5. The chip 70 includes a ceramic header 84 and two electrical conductors 85, 86 spaced apart from each other and extending through the header 84. A metal housing 89 surrounds the ceramic header 84. A highly doped silicon layer 87 is disposed on a sapphire substrate 88 which, in turn, is mounted on the header 84.

A pair of spaced apart pads 94, 95 is defined on the silicon layer 87. A bridge 50 interconnects the pair of spaced apart pads 94, 95. Two metallized lands 90, 91 cover the pads 94, 95 and cover most of the silicon layer 87. The land 90 covers the pad 94 and the land 91 covers the pad 95. The only portion of the silicon layer 87 not covered by the lands 90, 91 is the bridge 50. The land 90 is electrically connected through a solder 75 to the electrical conductor 85 and the land 91 is electrically connected through a solder 76 to the electrical conductor 86. By covering the pads 94, 95 with the lands 90, 91, respectively, the resistance between the two electrical conductors 85, 86 depends almost entirely on the resistance of the bridge 50.

The containment cup 20 is aligned and connected within the tube 18 of the TLX pyrotechnic transmission line 14 so that the bridge 50 faces the burst disc 80 and so that the two electrical conductors 85, 86 extend in a direction away from the burst disc 80. The burst disc 80 and the chip 70 are spaced apart from each other to define a volume of no greater than .25 cc located within the containment cup 20 and between the burst disc 80 and the chip 70. This volume of no greater than .25 cc is designated in FIG. 2 with the reference numeral 98. The two electrical conductors 85, 86 of the semiconductor bridge chip 70 are electrically connected through an associated pair of parallel-connected electrical wires 60, 61 to an impact sensor 30.

A containment cup 21 and burst disc 81 are associated with the pyrotechnic transmission line 15. A containment cup 22 and a burst disc 82 are associated with the pyrotechnic transmission line 16. A containment cup 23 and a burst disc 83 are associated with the pyrotechnic transmission line 17. A semiconductor bridge chip 71 having a semiconductor bridge 51 is associated with the pyrotechnic transmission line 15 and is connected through a pair of electrical wires 62, 63 to the impact sensor 30. A semiconductor bridge chip 72 having a semiconductor bridge 52 is associated with the pyrotechnic transmission line 16 and is connected through a pair of electrical wires 64, 65 to the impact sensor 30. A semiconductor bridge chip 73 having a semiconductor bridge 53 is associated with the pyrotechnic transmission line 17 and is connected through a pair of electrical wires 66, 67 to the impact sensor 30.

During operation, the impact sensor 30 generates an electrical signal, herein referred to as a firing signal, in response to sensing a vehicle collision. The firing signal is transmitted over the electrical wires 60, 61, 62, 63, 64, 66, 67, 68 for actuating the associated bridges 50, 51, 52, 53. The actuation of each of the bridges 50, 51, 52, 53 and the subsequent ignition of each associated pyrotechnic transmission line is the same. For simplicity, only the actuation of the bridge element 50 and the subsequent ignition of the pyrotechnic transmission line 14 is described herein.

When the firing signal is transmitted over the electrical wires 60, 61, an electrical potential difference is established between the two electrical conductors 85, 86. The magnitude of this electrical potential difference is sufficient to actuate the bridge 50. Upon actuation of the bridge element 50, a pressure is developed in the .25 cc volume 98. The burst disc 80 bursts at a predetermined pressure and a pressure pulse is directed into the pyrotechnic transmission line 14. The pressure pulse directed into the pyrotechnic transmission line 14 is about 1,000–1,500 psi for about 25–50 microseconds. This pressure pulse is of a sufficient magnitude for a sufficient time duration to ignite the pyrotechnic transmission line 14.

The pressure in the volume 98 builds up quickly because of the presence of the burst disc 80. Without the presence of the burst disc 80, the magnitude of the pressure pulse may not be sufficient to ignite the pyrotechnic transmission line 14. Furthermore, without the presence of the burst disc 80, the direction of the pressure pulse would not be in the proper direction to ignite the pyrotechnic transmission line 14.

By using the assembly of the burst disc 80 and the bridge 50, as described hereinabove, the need for conventional hot wire squibs, such as microdets, to ignite the pyrotechnic transmission line 14 has been eliminated. One advantage in using the assembly of the burst disc 80 and the bridge 50 is that the explosive material, i.e., the reactive material disposed on the tube 18 of the pyrotechnic transmission line 14 is not in direct contact with the bridge 50. Another advantage is that the assembly would be classified as a non-explosive item. Such a classification allows shipment of the assembly as a non-explosive item, resulting in reduced shipping costs.

The ignition of the bridge 51 results in the ignition of the pyrotechnic transmission line 15 in the same manner that the ignition of the bridge 50 results in the ignition of the pyrotechnic transmission line 14. Each of the bridges 50, 51 acts as a backup for the other bridge. If one of the bridges 50, 51 does not ignite in response to the firing signal transmitted from the impact sensor 30, then the ignition of the other bridge results in the ignition of the respective pyrotechnic transmission line. When the ignition of either one or both of the pyrotechnic transmission lines 14, 15 reaches the inflator 12, the propellant grains within the inflator 12 ignite. Thus, the ignition of either one or both of the pyrotechnic transmission lines 14, 15 ignites the propellant grains within the inflator 12.

Similarly, the ignition of the bridge 52 results in the ignition of the pyrotechnic transmission line 16 and the ignition of the bridge 53 results in the ignition of the pyrotechnic transmission line 17. Each of the bridges 52, 53 acts as a backup for the other bridge. If one of the bridges 52, 53 does not ignite in response to the firing signal transmitted from the impact sensor 30, then the ignition of the other bridge results in the ignition of the respective pyrotechnic transmission line. Upon ignition of one or both of the pyrotechnic transmission lines 16, 17, ignitable material (not shown) within the pretensioner 13 is ignited. The pretensioner 13 is actuated by the ignition of the ignitable material to rotate a spool of the seat belt retractor 11 in a belt retraction direction.

It will be appreciated that the pyrotechnic transmission lines 14, 15 are redundant for the purpose of igniting the propellant grains within the inflator 12. Hence, even if one of the pyrotechnic lines 14, 15 were to break, the propellant grains within the inflator 12 would still ignite in response to ignition of the pyrotechnic transmission line which is not broken. Similarly, the pyrotechnic transmission lines 16, 17 are redundant for the purpose of igniting the ignitable material within the pretensioner 13. Although only the inflator 12 and the pretensioner 13 are shown in FIG. 1 as being connected to the impact sensor 30, it is possible that additional actuatable safety devices could be similarly connected to the impact sensor 30 by providing an additional header and associated electrical wiring between the impact sensor 30 and each additional pyrotechnic transmission line.

For example, another inflator with dual pyrotechnic transmission lines could be connected to the impact sensor 30 by adding a header between the impact sensor 30 and each additional pyrotechnic transmission line. Each additional pyrotechnic transmission line is connected with the impact sensor 30 so that ignition of the associated bridge will result in ignition of the associated pyrotechnic transmission line. The connection of dual pyrotechnic transmission lines to each actuatable safety device provides a redundant ignition system for the vehicle safety system 10.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An apparatus comprising:
    an ignitable pyrotechnic transmission line including a tube having reactive material therein which ignites when subjected to a pressure pulse of a predetermined magnitude for a predetermined time duration; and
    an actuatable semiconductor bridge operatively connected with one end of said pyrotechnic transmission line for, when actuated, creating a pressure pulse of at least said predetermined magnitude for at least said predetermined time duration to ignite the reactive material in said tube.

2. The apparatus of claim 1 wherein said tube is made of a plastic material that can withstand high temperature.

3. The apparatus of claim 1 wherein said tube is made of polyvinylchloride.

4. The apparatus of claim 1 further including an actuatable airbag inflator which actuates in response to ignition of said pyrotechnic transmission line and is operatively connected with said pyrotechnic transmission line for, when actuated, inflating an airbag to protect an occupant of a vehicle during a collision.

5. The apparatus of claim 4 further including an impact sensor operatively connected with said semiconductor bridge for sensing a collision of the vehicle and for providing a firing signal in response to the collision to actuate said semiconductor bridge to ignite said pyrotechnic transmission line and thereby to actuate said airbag inflator.

6. The apparatus of claim 1 further including a burst disc disposed within said tube and located between said semiconductor bridge and the other end of said pyrotechnic transmission line, said burst disc and said semiconductor bridge at least partially defining between them a chamber having a volume no greater than .25 cc.

7. The apparatus of claim 6 further including a containment cup having one end to which said semiconductor bridge is connected and an axially opposite end to which said burst disc is connected, said containment cup cooperating with said semiconductor bridge and said burst disc to define said chamber having a volume no greater than .25 cc.

8. The apparatus of claim 6 wherein said burst disc is made of aluminum foil.

9. The apparatus of claim 1 further including a pair of electrical conductors connected to said semiconductor bridge for applying a potential difference of at least a predetermined magnitude across said semiconductor bridge to actuate said semiconductor bridge.

10. The apparatus of claim 9 further including a burst disc disposed within said outer tube and located between said semiconductor bridge and the other end of said pyrotechnic transmission line, said burst disc and said semiconductor bridge at least partially defining between them a chamber having a volume no greater than .25 cc.

11. The apparatus of claim 10 wherein said burst disc is made of aluminum foil.

12. An apparatus comprising:
an actuatable airbag inflator for, when actuated, inflating an airbag to protect an occupant of a vehicle during a collision;
an ignitable pyrotechnic transmission line including a tube having reactive material therein which ignites when subjected to a pressure pulse of a predetermined magnitude for a predetermined time duration, said pyrotechnic transmission line having one end connected to said actuatable airbag inflator for, when ignited, actuating said airbag inflator;
an actuatable semiconductor bridge spaced apart from said airbag inflator and operatively connected at the other end of said pyrotechnic transmission line for, when actuated, creating said pressure pulse of at least said predetermined magnitude and for at least said predetermined duration; and
an impact sensor operatively connected with said semiconductor bridge for sensing a collision of the vehicle and for providing a firing signal in response to the collision to actuate said semiconductor bridge to ignite said pyrotechnic transmission line and thereby to actuate said airbag inflator.

13. The apparatus of claim 12 wherein said tube is made of a plastic material that can withstand high temperature.

14. The apparatus of claim 12 wherein said tube is made of polyvinylchloride.

15. The apparatus of claim 12 further including a burst disc disposed within said tube and located between said semiconductor bridge and the other end of said pyrotechnic transmission line, said burst disc and said semiconductor bridge at least partially defining between them a chamber having a volume no greater than .25 cc.

16. The apparatus of claim 15 further including a containment cup having one end to which said semiconductor bridge is connected and an axially opposite end to which said burst disc is connected, said containment cup cooperating with said semiconductor bridge and said burst disc to define said chamber having a volume no greater than .25 cc.

17. The apparatus of claim 15 wherein said burst disc is made of .001 inch thick aluminum foil.

18. The apparatus of claim 12 further including a pair of electrical conductors connected to said semiconductor bridge for applying a potential difference of at least a predetermined magnitude across said semiconductor bridge to actuate said semiconductor bridge.

19. The apparatus of claim 18 further including a burst disc disposed within said tube and located between said semiconductor bridge and the other end of said pyrotechnic transmission line, said burst disc and said semiconductor bridge at least partially defining between a chamber having a volume no greater than .25 cc.

20. The apparatus of claim 19 wherein said burst disc is made of aluminum foil.

* * * * *